United States Patent [19]

Jordan

[11] 4,304,528
[45] Dec. 8, 1981

[54] PASSIVE SOLAR POWERED PLANT WATERING SYSTEM

[76] Inventor: Robert D. Jordan, 885 Carthage Ct., Concord, Calif. 94518

[21] Appl. No.: 84,448

[22] Filed: Oct. 12, 1979

[51] Int. Cl.³ .............................................. F04B 19/24
[52] U.S. Cl. ................................... 417/208; 137/397; 137/430
[58] Field of Search ................ 417/207, 208, 209, 52, 417/379, 40; 137/397, 398, 430, 433

[56] References Cited

U.S. PATENT DOCUMENTS

| | | | |
|---|---|---|---|
| 748,046 | 12/1903 | Byers | 137/397 |
| 2,688,922 | 9/1954 | Bonaventura et al. | 417/209 X |
| 3,972,651 | 8/1976 | Fletcher et al. | 417/207 X |
| 4,083,147 | 4/1978 | Garrick | 137/397 X |

FOREIGN PATENT DOCUMENTS 184825  2/1956  Austria ............................... 417/208

Primary Examiner—Carlton R. Croyle
Assistant Examiner—Edward Look
Attorney, Agent, or Firm—Bielen and Peterson

[57] ABSTRACT

A plant watering system that is controlled and operated in cycles by the heating effects of the sun, the system including a sealed water supply tank; a metering reservoir having a water supply conduit connected to the supply tank for delivering water from the supply tank to the metering reservoir, a float operated ball valve, and a triggering mechanism for releasing water from the metering reservoir; and, a distribution tank having an air relief conduit connected to the supply tank, a float operated pressure relief valve for releasing vapor pressure in the water supply tank through the air relief conduit; and, a distribution network for distributing the water to one or more plants, the system being operated by exposing the water supply tank to the sun causing delivery of water to the metering reservoir by vapor pressure in the tank, the metering tank releasing the water to the distribution tank for distribution when a predetermined quantity of water in the metering reservoir is obtained, the released water in the distribution tank operating the pressure relief valve, relieving the vapor pressure in the sealed tank and, after dispensing the water, to the plants initiating renewal of the cycle.

14 Claims, 2 Drawing Figures

PASSIVE SOLAR POWERED PLANT WATERING SYSTEM

BACKGROUND OF THE INVENTION

This invention relates to a watering device suitable for watering indoor, outdoor or greenhouse plants automatically. In particular this invention is a watering system that utilizes the sun to both control and operate the watering system without the use of electrical means.

Automatic watering systems are in common use in various environments. Sophisticated systems for commercial greenhouses may supply water to selected plants under direction of a central processor which analyzes data which may include greenhouse temperature and humidity, moisture content of the soil and other factors. Such systems can closely monitor environment conditions and meter water accordingly. However, such systems are expensive to install and operate.

Automatic timer systems are widely employed to deliver water to plants according to preselected time schedules. Such systems are common because of their low or moderate costs. However, such systems operate only according to time schedules and take no account of varying climatic conditions. Climatic conditions can dramatically affect plant requirements for water, whether the plants are indoors or outdoors.

A series of dry, hot sunny days can rapidly deplete soil moisture and parch plants. Conversely, a series of cool overcast days can result in overwatering when done according to a preset schedule. This can similarly result in wilt or root damage.

It is therefore desired to provide a watering system that effectively meters water delivery to plants according to climatic conditions which parallels the plant's needs. However, it is preferable that the system be inexpensive in order that it can be adapted for general use, particularly in the household. Ideally the system should be operable independent of electrical systems, enabling convenient outdoor use or use in structures without electricity. Continuous drip irrigation systems which are operable without electrical controls do not provide the cyclic flooding and draining which most plants seem to prefer for conveying nutrients down to the root structures.

The watering system devised and described herein has the aforementioned advantages, without the disadvantages.

SUMMARY OF THE INVENTION

The watering system of this invention is both controlled and operated by the sun's energy without the use of electricity. The watering system is comprised of cooperating, interconnective components including a sealed water supply tank, a metering reservoir which periodically receives and releases predetermined quantities of water, and a distribution tank which dispenses the water to the plant or plants. The duration of the period from one release of water to the next release is variable depending on climatic conditions. Furthermore, the driving force for operating the system is powered by the heating ability of the sun thereby eliminating the need for electrically operated pumps and valves.

The sealed water supply tank contains a relatively large quantity of water for use over an extended period of time. The supply tank is refilled when depleted by the repeated watering cycles. Alternately, a continuous supply of water may be provided to refill the tank when emptied by an automatic replenishment system. This system would simply comprise a conventional float activated valve in the tank with a connection to a water source such as a hose bib in the user's yard. The connection can be made by a common garden hose which is connectable to a female hose fitting mounted to the tank. Such systems are well known and are similar to the refill system for toilet reservoirs. A design for such system can be scaled or modified to the less demanding refill rate requirement of the described watering system.

The water supply tank is connected to the metering reservoir by a conduit which communicates at one end with the lower portion of the supply tank to effectively draw the water from the tank, and, at the other end with the upper portion of the metering reservoir to avoid hydraulic back pressure on filling. The water supply tank is hermetically sealed and is positioned for exposure to the sun. When the tank is substantially, but not wholly filled, and is heated by the sun, a small portion of the water within the tank evaporates and increases the vapor pressure in the unfilled portion of the tank. The increase of vapor pressure inside the tank over atmospheric pressure outside the tank creates a pressure differential that causes water to flow through the conduit from the supply tank to the metering reservoir. The flow is gradual as the displacement of water from the supply tank to the metering reservoir allows expansion of the vapor and reduction of the vapor pressure. Additional evaporation must occur to again generate the pressure differential.

To encourage the heating of the water in the supply tank, the tank is preferably coated with a dark heat absorbing and conducting material to obtain heat from the infrared rays of the sun and transmit the heat to the water and air within the tank. To further enhance the effect, wind screens and reflectors can be provided.

The metering reservoir comprises a temporary storage reservoir for delivery of water in an abrupt quantity rather than in a trickle. From experience it has been discovered that most plants prefer that water is provided periodically in quantity rather than by continuous drip. The former method provides a flooding and draining which effectively transports nutrients to the plant roots without causing possible damage or rot to the roots.

The metering reservoir comprises a water storage area above a discharge orifice in which is seated a ball valve operated by a float. The float is restrained by a triggering mechanism to prevent seepage as the equilibrium point is reached. In this manner when the triggering mechanism releases the float the ball valve is allowed to suddenly rise and allow discharge of the water through the discharge orifice to the distribution tank.

The distribution tank receives the quantity of water from the metering reservoir and distributes the water to the plants by a network of feed lines. Contained in the distribution tank is an air relief valve operated by a float. The air relief valve is connected by a conduit to the air portion of the supply tank. When the quantity of water is discharged from the metering reservoir to the distribution tank, the float is raised and the air relief valve is opened allowing release of the built-up vapor pressure in the supply tank. The cycle thereby commences again from an equilibrium state and filling of the metering reservoir is delayed until the vapor pressure is raised. If by this time it is night, or cloudy, the repetition of the cycle is further delayed as the supply tank is unable to be heated to the extent necessary to initiate water delivery. In this manner, the water delivery cycle does not follow a timed schedule, but is dependent on climatic conditions which affect the vapor pressure within the supply tank.

DETAILED DESCRIPTION OF THE PREFERRED EMBODIMENT

Figure 1:
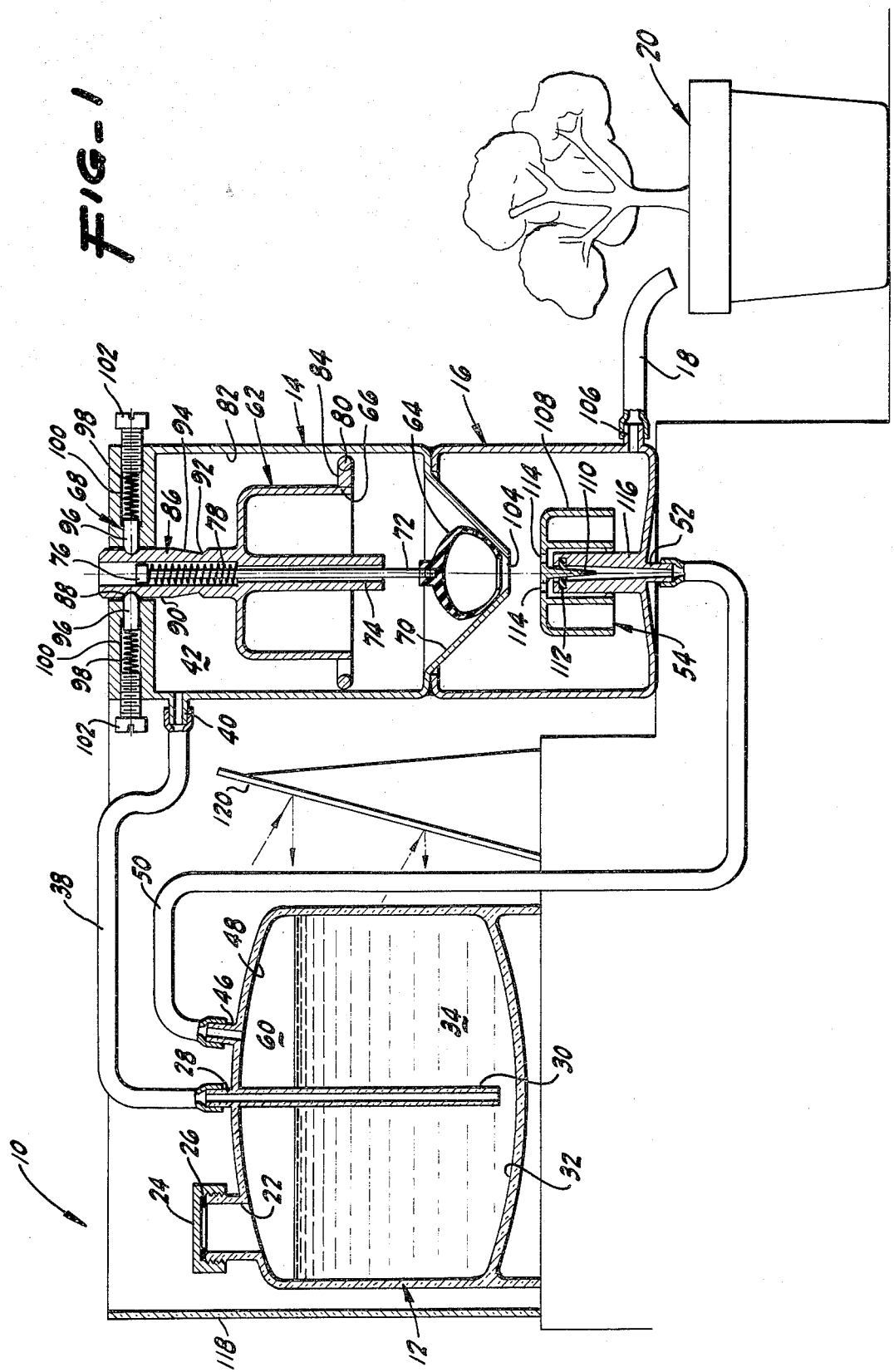
FIG. 1 is a schematic, cross sectional view of the plant watering system.

Referring to the schematic illustration of FIG. 1, the plant watering system, designated generally by the reference numeral 10, includes a water supply tank 12 which operates in cooperation with a metering reservoir 14 to deliver at irregular periods a quantity of water to a distribution tank 16. The distribution tank provides for gravity distribution of water to plants by conventional feeder lines 18, one of which is shown positioned for discharge to potted plant 20.

The water supply tank 12 is a hermetically sealed container with a refill orifice 22 that is equipped with a cap 24 and seal 26. The tank 12 includes an external hose connector 28 which is integral to a depending internal tube 30 that terminates immediately above the tank bottom 32 for drawing or delivery water 34 from the tank.

Figure 2:
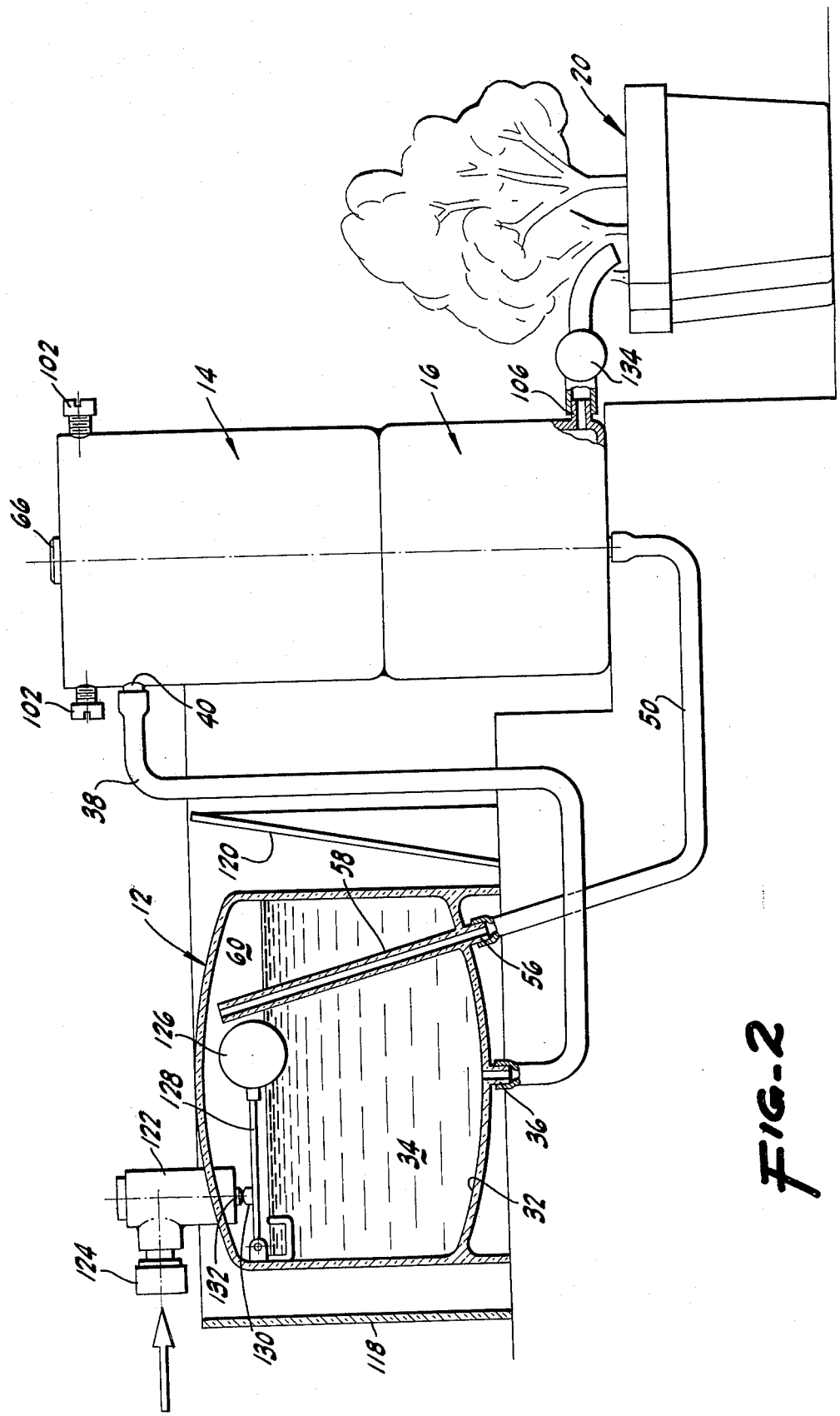
FIG. 2 is a schematic view of a variation of the plant watering system.

Referring to FIG. 2, the tube 30 and connector 28 of FIG. 1 can be substituted by a connector 36, shown in FIG. 2 as an alternate means of drawing or delivering water from the tank.

Referring again to FIG. 1, the hose connector 28 has a hose conduit 38, which is connected at its opposite end to a hose connector 40 mounted to the upper portion 42 of the metering reservoir 14. The metering reservoir should be arranged with respect to the supply tank such that the hose connector 40 through which water is drawn to the metering reservoir is above the maximum level of water in the supply tank to prevent an unwanted siphoning action from occurring. The connector 28 and integral tube 30, the hose conduit 38 and connector 40 provide a communicating passage from the water portion 34 of the water tank 12 to the metering reservoir 14.

A second hose connector 46 mounted to the top of the tank 48 has a second hose conduit 50 connected thereon. The hose conduit 50 has an opposite end connected to a hose connector 52 mounted to a pressure relief valve 54 within the water distribution tank 16.

As shown in the alternate embodiment of FIG. 2, a hose connector 56 and integral tube 58 directed from the tank bottom 32 to an air portion 60 of the tank may alternately be substituted for the arrangement of FIG. 1. In both embodiments the tanks should not be completely filled, but should contain an air portion 60 as shown in which a vapor pressure can develop.

The water tank hose connector 46, hose conduit 50 and distribution tank connector 52, of FIG. 1 provide a communicating passage between the air portion 60 of the supply tank 12 and the distribution tank 16 when venting by the pressure relief valve 54 occurs. The distributic tank 16 is not sealed and allows eventual venting to the atmosphere. The corresponding component elements of FIG. 2 function in the same manner.

Because condensation may occur in the hose conduit 50, it should be positioned in the sun or insulated.

The metering reservoir 14 is constructed to deliver a predefined quantity of water to the distribution tank 16 for distribution through the feed lines 18 to the plants 20. The function of the metering reservoir is to store water gradually fed to it from the supply tank by action of vapor pressure within the supply tank which forces water therein through the conduit as a result of a pressure differential. Because most plants appear to respond better to periodic volume watering rather than continuous drip watering, the metering reservoir stores rather than immediately distributes the gradual quantities received.

In the metering reservoir is a float valve unit 62 which is comprised of a resilient valve ball 64, similar to that used in a conventional toilet, a float 66 and a triggering mechanism 68 for restraining action of the float until an added buoyant force is developed for sudden release and displacement of the float. The ball 64 is seated on a funnel-like valve seating 70 formed by the bottom of the metering reservoir. The ball is connected to the float by a lift rod 72. The lift rod is concentrically centered in a guide sleeve 74 in the float 66 and connected at its opposite end to a stop cap 76 which retains a compression spring 78 around the end of the lift rod 72 and within an enlarged portion of the guide sleeve 74. The float is concentrically centered within the reservoir by an annular centering ring proximately positioned to the inner wall 82 of the reservoir. The centering ring 80 is connected to the outer perimeter of the float 66 by spokes 84, which allow free flow of water around the float. At the top of the float is a slide cam 86 of circular cross section. The cam 86 is fabricated integral to the float 66, but may alternately comprise a separate element attached to the float. The slide cam 86 has an upper annular groove 88 which is relatively steep and deep, a cylindrical middle portion 90 and a shallow lower groove 92 with a gentle upper slope 94. Slidably engaged on the surface of the slide cam 86 are a plurality of displaceable round end pins 96. The pins 96 are biased toward the slide cam by springs 98 located with the pins in a stepped guide barrel 100. The springs and pins are retained by adjustment screws 102 which apply the proper compression to the springs 98 to provide for proper operation of the float unit.

For example, when positioned in the deep grooves as shown in FIG. 1, the pins will prevent the float from rising upon reaching the initial point of buoyancy. Rather, the float will remain in position until the buoyancy force becomes such as to overcome the restraining effect of the pins. Once this occurs the float will rapidly rise, compress the lift rod spring 78 resulting in a spring assisted rise of the buoyant ball valve 64. The water quickly discharges through a large opening 104 at the bottom of the reservoir into the distribution tank 16. The shallow lower groove 92 cooperates with the pins 96 to temporarily retain the float in an elevated position. Once the ball valve and lift rod have begun to descend and have added to the weight of the float, the component force of the pins is overcome and the float and ball valve descend to a closed position.

The distribution tank essentially provides for gravity distribution of the water released to the plants via conduit network or as shown for simplicity, the feeder line 18, which is fitted over a connector 106. The discharge tank 16 as mentioned includes a pressure relief valve 54 which comprises a float 108 with an integral depending needle valve pin 110 seated in a resilient O-ring 112 mounted within a tubular discharge column 116, which functions also as a guide for the float. When water enters the distribution tank 16 from the metering reservoir 14, the float rises allowing the vapor pressure in the supply tank to be vented past the unseated needle valve pin 110, through vent holes 114 in the top of a center section of the float, or down around the column 116 in the clearance space between the column 116 and float. In this manner, the tank pressure and atmospheric pressure are equalized. A subsequent cycle must commence from this equalized condition, generate a sufficient vapor pressure to overcome the water head differential and gradually fill the reservoir.

The ability to generate a system activating water vapor pressure can be enhanced by arranging transparent wind screen 118 around the supply tank 12, which substantially inhibits convective cooling of the tank by the wind. Further, a reflector mirror 120 can be positioned with respect to the tank to increase incident radiation on the tank.

The supply tank in FIG. 1 requires periodic refilling. Consequently it should be preferably of a substantially larger dimension in comparison with the metering reservoir and distribution tank than as schematically illustrated in FIG. 1.

In the alternate embodiment of FIG. 2, the supply tank 12 is equipped with an automatic refill mechanism 122 having a female hose connector 124 for connection to a garden hose. The refill mechanism 122 operated by a float 126 mounted on a lever 128 with a pin contact 130 for displacing a valve pin 132 is a float valve of conventional design. In this embodiment the supply tank can be relatively small as it is continually replenished with water. The watering system of FIG. 2 includes a discharge connector 106 mounted to a manifold 134 for distribution of released water to a plurality of plants.

From the foregoing description of the features of the preferred embodiments it is apparent that the necessary vapor pressure for water transport will only occur when the tank is adequately heated. Since the heating is provided by the sun, activation of the watering system will closely parallel the plants' need for water. On cloudy days the plants' requirements are minimal. On hot, sun scorching days the requirement is great and the system may go through two or more cycles. At night as temperatures fall with the absence of incident sunlight, the supply tank cools. This may cause a pressure equalization as the vapor pressure falls below atmospheric pressure resulting in air bubbling up into the tank through the water delivery tube from the metering reservoir.

The frequency of cycling, and hence the quantity of water delivered can be adjusted either by select placement of the supply tank to receive more or less sunlight, or, by the vertical positioning of the metering reservoir and hoses with respect to the supply tank. In this latter regard, the relative water head between the supply tank water level and the discharge to the metering reservoir is altered requiring a greater or less vapor pressure to overcome this relative water head. For example, if a large flow of water is desired even when the weather is mild, no part of the water delivery hose conduit should be more than a few inches above the tank, and the tank and reservoir should be at about the same level. Conversely, if low flow rates or flow rates only during very hot periods are desired, the hose can be raised to a level a few feet above the tank.

While in the foregoing specification embodiments of the present invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A solar powered plant watering system comprising:

container means for containing water, said container means being locatable for exposure to heating effects of the sun, said container means having means for allowing generation of water vapor pressures on exposure to heating effects of the sun when containing water, wherein said container means includes an air space portion in communication with contained water, said means for allowing generation of a vapor pressure including sealing means for sealing said air space portion;

water delivery means for delivering water from said container means in response to generated vapor pressures wherein said water delivery means comprises a conduit in direct communication with the contained water; and, a metering reservoir, said water delivery means being connected to said metering reservoir for delivery of water from said container means to said metering reservoir, said metering reservoir having means for discharging water from said reservoir when a predetermined quantity of water has been delivered to said metering reservoir.

2. The solar powered plant watering system of claim 1 wherein said container means includes an air space portion in communication with contained water, said means for allowing generation of a vapor pressure including sealing means for sealing said air space portion and wherein said water delivery means comprises a conduit in direct communication with the contained water, said conduit being connected to said metering reservoir.

3. The solar powered plant watering system of claim 2 wherein said means for discharging water from said reservoir comprises a float operated valve mechanism.

4. The solar powered plant watering system of claim 3 wherein said float operated valve mechanism includes triggering means for rapid discharge of water.

5. The solar powered plant watering system of claim 4 wherein said float operated valve mechanism includes a float, a buoyant ball valve and a lift rod connecting said float and ball valve, and wherein said triggering means comprises a restraining device in engagement with said float for restraining displacement of said float until substantial buoyant forces are generated which overcome said restraining device and release said float.

6. A solar powered plant watering system for providing a periodic, volume discharge of water comprising in combination:

a. a storage container means for containing water, said container means being locatable for exposure to heating effects of the sun, said container means having means for allowing generation of water vapor pressures on exposure to heating effects of the sun when containing water, wherein said container means includes an air space in communication with contained water wherein an increased vapor pressure is generated upon heating; and b. a metering reservoir, said metering reservoir having means for discharging water from said reservoir when a predetermined volume of water has been delivered to said metering reservoir, said container means and said metering reservoir having an interconnecting water delivery means for delivering water from said container means to said metering reservoir in response to generated vapor pressure in said air space.

7. The solar powered plant watering system of claim 6 comprising further a vapor pressure relief means operable on discharge of said water from said metering reservoir for relieving vapor pressure in said air space of said container means and restarting vapor pressure increase and water delivery to said metering reservoir.

8. The solar powered plant watering system of claim 6 wherein said storage container means comprises a sealed container partially filled with water, said container being exposed to the heating effects of the sun.

9. The solar powered plant watering system of claim 6 wherein said means for discharging water from said reservoir comprises a float operated valve mechanism.

10. The solar powered plant watering system of claim 6 wherein said metering reservoir includes a distribution tank, arranged to receive water discharged from said metering reservoir, said distribution tank having conduit means for gravity distribution of water to locations to be watered.

11. The solar powered plant watering system of claim 10 wherein said vapor pressure relief means comprises a float valve in said distribution tank responsive to water received in said distribution tank discharged from said metering reservoir, said float valve being operably connected to an air conduit connected to said air space in said storage container means.

12. A solar powered plant watering system comprising:

a. container means for containing water, said container means being locatable for exposure to heating effects of the sun and including an air space portion in communication with contained water for allowing generation of water vapor pressures on exposure to heating effects of the sun when containing water wherein said air space includes means for sealing said air space portion;

b. water delivery means comprising a conduit in direct communication with the contained water for delivering water from said container means in response to generated vapor pressures;

c. a metering reservoir, said conduit of said water delivery means being connected to said metering reservoir for delivery of water from said container means to said metering reservoir, said metering reservoir having means for discharging water from said reservoir when a predetermined quantity of water has been delivered to said metering reservoir comprising a float operated valve mechanism including triggering means for rapid discharge of water wherein said float operated valve mechanism includes a float, a buoyant ball valve and a lift rod connecting said float and ball valve, and wherein said triggering means comprises a restraining device in engagement with said float for restraining displacement of said float until substantial buoyant forces are generated which overcome said restraining device and release said float.

13. The solar powered plant watering system of claim 12 comprising further a distribution means for receiving water from said metering reservoir and distributing the water received to plants.

14. The solar powered plant watering system of claim 13 wherein said distribution means includes a float operated pressure relief means connected to the air portion of said container means for relieving vapor pressures generated in said container means to atmosphere.

* * * * *